Patented Dec. 18, 1934

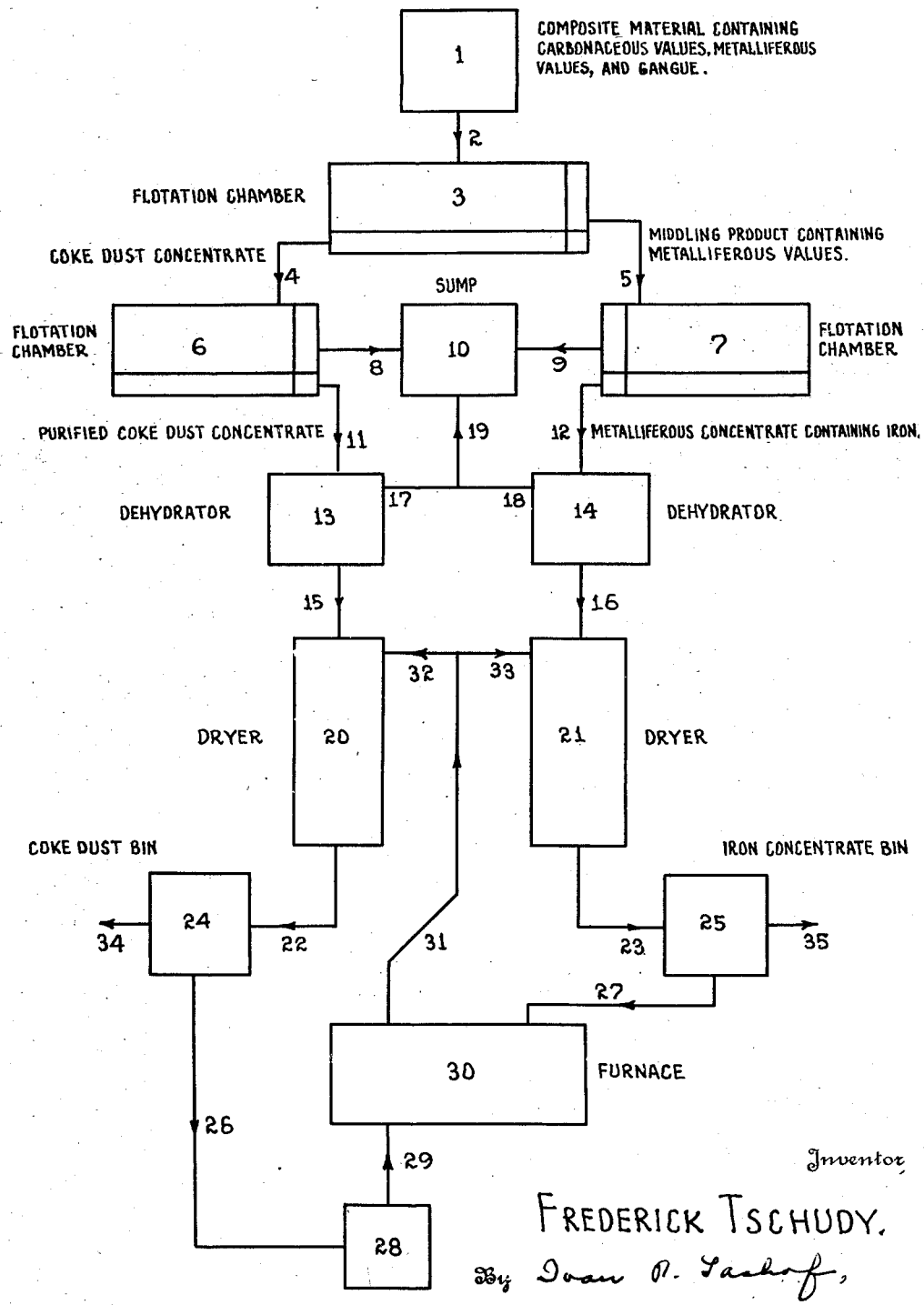

1,984,386

UNITED STATES PATENT OFFICE 1,984,386

PROCESS OF SEPARATING COMPOSITE MATERIALS

Frederick Tschudy, Ensley, Ala.

Application December 4, 1928, Serial No. 323,729

16 Claims. (Cl. 209—164)

This invention relates to a process of treating composite material containing carbonaceous values, metalliferous values and gangue to recover therefrom purified carbonaceous and metalliferous products, preferably in marketable form. The separation of the composite material is preferably carried out by the flotation process, and particularly by froth-flotation.

The present invention, while obviously not limited thereto, is admirably adapted for the treatment of composite waste material such as furnace dust, factory sweepings, collected dust from factory operations, dust arising from grinding and abrasion treatments, and foundry sands. The present invention has given very satisfactory results in the treatment of blast furnace dust or the material carried off from the blast furnace including flue dust. It may be pointed out that while, under ordinary conditions, a certain portion of the material will be in dust form, the remainder may be much coarser and this will depend upon a number of factors including, in the case of furnace dust, the operating pressure. When treating dust from an iron blast furnace, it has been found that the present process affords an efficient recovery of coke-dust and iron-containing material.

According to the present invention, a material containing carbonaceous values, metalliferous values, and a gangue is treated in a continuous process to recover purified values in a commercially marketable condition.

In carrying out the invention, a composite material containing carbonaceous values, metalliferous values and a gangue is subjected to a flotation-treatment, or a series of flotation treatments to produce a purified carbonaceous material or product and a metalliferous concentrate. In the preferred form of the invention, the purified carbonaceous material is used to furnish fuel and act as a reducing agent in the smelting of the metalliferous concentrate. In its more specific form, according to the present invention, the composite material containing carbonaceous values, metalliferous values, and gangue, is subjected to a flotation-treatment to produce a carbonaceous concentrate and a gangue containing the metalliferous values. Thereafter, the carbonaceous concentrate is subjected to a flotation-treatment to produce a relatively pure carbonaceous material. The gangue containing the metalliferous values is subjected to a flotation-treatment to produce a metalliferous concentrate. Proceeding in accordance with the above, there are recovered a relatively pure carbonaceous material and a metalliferous concentrate which may be, when desired, further conditioned to convert them into a marketable form.

It is to be noted that in most of the composite materials treated, the carbonaceous component is present in a high percentage; further, the percentage of metalliferous values present is relatively high. In other words, according to the present invention, in its preferred form, the composite material treated is high in values and low in gangue. Therefore, in each flotation-step a predominating amount of the material undergoing treatment is raised or floated from the gangue. This is in direct contrast with the ordinary flotation process, in which a predominating amount of the material subjected to the flotation-treatment is sunk in the bath and recovered as gangue, while only a small portion of the material constitutes the values and is floated from the bath.

In the preferred form of the present invention, the composite material to be treated is disintegrated in order to facilitate the recovery of the values. In most cases, the carbonaceous component of the composite material is in such a condition as to be amenable to flotation-treatment without disintegration. However, frequently the metalliferous values are present in the form of large particles and, therefore, the product is preferably subjected to a disintegrating treatment. The reduction or disintegrating step is also desirable since, as pointed out, a predominating amount of the material treated is raised or floated from the gangue and, therefore, it is necessary to maintain a proper relation of fluid to mass in the flotation bath. This can be better accomplished by material in a reduced state.

Therefore, my invention in its preferred form comprises treating a composite material containing carbonaceous values, metalliferous values, and gangue by subjecting the material to a flotation-treatment, floating a carbonaceous concentrate from the top zone of the flotation bath, allowing the gangue containing the metalliferous values to sink through the bath, subjecting the carbonaceous concentrate to a flotation-treatment, floating a relatively pure carbonaceous material from the flotation bath, subjecting the gangue containing the metalliferous values to a flotation-treatment, floating a metalliferous concentrate from the bath, and recovering a relatively pure carbonaceous material product and a metalliferous concentrate. It is to be noted that in the preferred form of the invention, a predominating amount of the material undergoing treatment in each flotation bath is floated from the top zone or surface of the bath. In the more specific aspect of the invention the entire composite material is reduced to a disintegrated condition so as to enable an efficient recovery to be made and to maintain the proper relationship between the fluid and the mass of each flotation bath.

One of the features of the present invention is the utilization of a flotation bath in which there has been introduced a gaseous medium strongly and controllably charged with electrical ions, preferably by passing over a corona discharge, as more particularly pointed out in my Patent No. 1,840,267, granted January 5, 1932. However, it is desired to indicate that while this system of flotation employing a bath into which there has been introduced a gaseous medium strongly and controllably charged with electrical ions is preferably used, the present invention is not limited to the use of such a flotation bath.

In order that the present invention may be completely understood, it will be illustrated by its application to the treatment of blast furnace dust emanating from a furnace used in the production of pig iron. The blast furnace dust containing carbonaceous values including coke dust, metalliferous values including iron or iron compounds, and gangue is first reduced to proper size and then subjected to a single flotation-treatment or a series of flotation-treatments as required to produce a purified carbonaceous product and a metalliferous concentrate containing iron, both of which may be passed through a dehydrator, then through a dryer and recovered as commercial products, or the carbonaceous product which is substantially pure coke dust may be charged into a furnace to act as a fuel and a reducing agent for smelting the iron concentrate to convert the latter into pig iron. The furnace dust collected from the blast furnace in which the iron concentrate is converted into pig iron may be again treated as set forth. In its preferred form, the present process is continuous or cyclic in character.

As applied to the treatment of furnace dust, the invention broadly resides in treating dust containing carbonaceous values, metalliferous iron-containing values, and a gangue by subjecting the dust to a flotation-treatment, and recovering a carbonaceous product and a metalliferous iron-containing concentrate. In the preferred form of the invention, the furnace dust is introduced into a flotation bath having a gaseous medium strongly and controllably charged with electrical ions by passing the same over a corona or by any equivalent charging means such as a Coolidge X-ray machine. The present invention also resides broadly in recovering coke dust and iron-containing furnace dust by subjecting the furnace dust to flotation-treatment. As previously pointed out, a preponderating amount of coke dust and iron-containing material undergoing treatment is raised or floated from the gangue, and preferably the furnace dust is reduced to a disintegrated condition, whereby it is adapted to maintain the proper relationship between the fluid and the mass of the flotation bath, and in this way aid in allowing the valuable material to rise to the top zone of each flotation bath to be collected as a concentrate.

Stated more specifically, the invention as applied to furnace dust having present coke and iron-containing material comprises, in its preferred form, disintegrating the material, introducing the disintegrated material into a flotation bath, preferably one utilizing a gaseous medium strongly and controllably charged with electrical ions by passing over a corona, collecting from said bath a coke-dust concentrate containing impurities, and a middling product containing iron and gangue, introducing the coke-dust concentrate into a flotation bath, collecting a relatively pure coke dust therefrom, introducing the middling product containing iron or iron compounds into a flotation bath, and collecting therefrom an iron-containing concentrate. When desirable, the iron-containing concentrate and the coke dust may be dehydrated and dried, that is conditioned, and the coke dust may be utilized to furnish heat and act as a reducing medium for the conversion of the iron-containing material into pig iron.

The accompanying drawing showing a flow sheet discloses the steps of one form of the present invention. Referring to the drawing, blast furnace dust collected at different points of the blast furnace gas line system is recovered and collected in a dust storage hopper 1 from which it is passed by conveying means 2, preferably after reduction to a disintegrated state, to flotation chamber 3. In order to reduce the collected dust prior to its introduction into the cell or flotation chamber 3, it may be passed through equalizing rolls or disintegrators. For the best results, substantially all or a greater part of the material should pass through a 14-mesh sieve. This will aid in effecting a high efficiency in recovery, and assist in maintaining the relation of fluid to mass in the flotation bath which is desirable in a process in which a predominating portion of the material treated is floated from the bath. Blast furnace dust will of course vary in the percentage of carbonaceous values, metalliferous values, and gangue, but usually the carbonaceous value, mostly coke dust, ranges from 50 to 80% of the total material to be treated.

There is produced in flotation chamber 3, a carbonaceous concentrate, mostly coke-dust, and a middling product or gangue containing metalliferous values, principally iron or iron compounds. The coke-dust concentrate is conveyed by suitable means to the purification chamber or cell 6. In some cases, it is necessary to have a series of purification cells. Proceeding with a single cell or with a series of cells, there is produced a relatively pure carbonaceous material or product, principally coke-dust. The purified carbonaceous material or coke-dust is carried by means of conveyors or the like to the dehydrator 13 and passed from the latter to a dryer 20 by means of the conveyor 15.

The gangue containing the metalliferous values or what is termed the middling product, rich in iron-containing constituents, passes from the flotation cell 3 by means of a suitable conveyor 5 to a flotation cell 7, or a series of flotation cells if required. The middling product, comprising the gangue from flotation cell 3, containing all the metalliferous values present in the original blast furnace dust, is subjected to a flotation-treatment in cell 7. In this cell, the metalliferous content of the middling product is separated by floating the same from the bath to produce a metalliferous or iron-containing concentrate, the impurities present in the middling product such as limestone and slag, sinking through the bath and being conveyed by conveyor 9 to the waste sump 10. This sump also receives from the conveyor 8 the gangue material discharged from the purification cell 6.

The metalliferous values floated from the bath of cell 7 are conveyed to the dehydrator 14 by a conveyor 12, and thereafter to a dryer 21 by means of a conveyor 16. It is desired to point out that in purification cell 3 a predominating proportion of the material treated is separated by raising it through the bath, and is floated from the top zone or the surface of the bath, and in purification cell 6 and middling product cell 7 again, a predominating portion of the material treated is raised through the bath to the top zone thereof and floated therefrom. From the above, it is clear that in the present process a predominating proportion of the material treated is floated from the top zone or surface of the bath and only a relatively small proportion of the material, that is the gangue, sinks through the bath of each flotation cell employed.

Waste sump 10 serves to collect various waste, and particularly the circulating waters from cells 6 and 7. The waste sump 10 is built in two sections isolated from each other so that the coke waste-waters coming from cell 6 do not mix with the iron waste-waters coming from cell 7. These waste-waters can be returned as circulating water to cells 6 and 7. If there is a surplus amount of water not required for circulation in cells 6 and 7, the surplus waste-water may be conveyed to a settling pond or sewer. The sump may be cleaned periodically to remove the waste material.

The dehydrators 13 and 14 may comprise any suitable system of apparatus such as centrifugals, vacuum drums or belts, filters, filter presses, gravity tanks, settlers, thickeners, or sliding chutes as may be found best applicable to the purpose, or required by the respective materials.

The carbonaceous product or coke dust entering dehydrator 13 and the metalliferous concentrate or iron-containing concentrate entering dehydrator 14, necessarily carry a considerable amount of water which is removed from the products while they are in the dehydrators. The water coming from the dehydrators 13 and 14 is brought through conduits 17, 18 and 19 to the waste sump 10.

The dry carbonaceous material or coke-dust is conveyed by a conveyor 22 from the dryer 20 to the bin 24, from which it may be removed by the conveyor 34. This coke-dust may be sold as a commercial product, or converted into briquettes and sold as such. However, in the preferred form of the present invention, the coke dust is utilized as hereinafter more fully set forth.

The iron-containing concentrate present in dryer 21 may be removed therefrom by a conveyor 23 to a storage bin 25. This material may be removed from the bin 25 by the conveyor 35, and sold as a commercial product. However, it is preferred that the concentrate be conveyed to blast furnace 30 by conveyor means 27. While this furnace may in general be any suitable type, for example the so-called air furnace or electrical furnace, it is preferred that the furnace be one that is heated by the injection of pulverized carbonaceous material or coke dust. When the furnace is of this character, coke dust from the bin 24 may be conveyed by conveyor 26 to the pulverized coke firing system 28 in operative communication with the furnace 30, by means of the connection 29. The firing system employed may be any of the various well known forms now in use by which pulverized fuel is employed for the heating of furnaces.

Preferably, the waste heat from the furnace 30 is conveyed through conduits 31, 32 and 33 to the dryers 20 and 21 respectively, thereby utilizing the waste heat for the drying of the purified carbonaceous material and iron-containing concentrate passing respectively through the dryers.

The dryers 20 and 21 may be of any suitable type, and may be fired by any means desired including coal, gas, oil or electricity. However, the preferred method of procedure is, as previously pointed out, to utilize a portion of the purified carbonaceous product to furnish the heat to dehydrate both the purified carbonaceous product and the metalliferous iron-containing concentrate. The dryers may be of the horizontal revolving type or the reciprocating scraper type. Preferably, rotating dryers heated by waste heat from the furnace 30 are employed.

Proceeding as outlined above, according to the present invention, there is produced in a continuous manner from a raw material such as furnace dust, a purified coke-dust and an iron-containing concentrate, and preferably, the coke-dust is used to furnish heat and act as a reducing agent for the melting of the iron whereby pig iron is produced. Since the composition of the composite material may vary in its content of carbonaceous values and metalliferous values, that is coke dust and iron or iron-containing compounds, and since it may be contaminated more or less by a varying amount of limestone and slag, the amount of coke-dust recovered available for the heating of the furnace 30 may be insufficient to furnish heat and reduce the iron-containing concentrate to pig iron. Under such conditions, the process may still be worked as a continuous process by charging through the firing apparatus 28 additional fuel in powdered form, together with the coke-dust recovered in the process.

It is preferred to utilize in the present invention the flotation process set forth in my Patent No. 1,840,267, granted January 5, 1932, but, as indicated, the process can be carried out utilizing other flotation treatments.

In the patent referred to, it has been pointed out that there is passed into the flotation bath a gaseous medium strongly and controllably charged with electrical ions, the charging being effected by passage over a corona or a Coolidge X-ray machine, or by any equivalent method. As an example, it may be stated that the gaseous medium employed in the present flotation process may be charged by passing through a pipe having 32,000 volts passing therethrough. As pointed out in the patent, the gaseous medium may comprise a single gas or a plurality of gases. The cells used in practicing the present invention and utilizing a gaseous medium which has been passed over a corona discharge may be equipped with condensing surfaces. Circulating waters may be used as set forth in the patent, and, at least a portion of the surface dust may be introduced into the flotation bath with the circulating water. The present invention may be carried out with the usual flotation agents such as coal-tar oils, coal-gas oil such as benzol, and cumarone, natural tar oils such as pine oil, petroleum or its distillation products, animal fats, plant fats and alifatic, aromatic and hetrocyclic hydrocarbons which are well known in the flotation art. In some cases, at least a portion of the composite material or blast furnace dust may be mixed with the flotation agent prior to its introduction into the flotation cell.

These flotation cells may be provided with different zones of turbulence and also with a zone of fluctuation at or near the surface of the bath, the fluctuation being controllable as to depth of reaction and time of repetition. These features will enable a cleaner separation of the values from the gangue and produce a cleaner coke dust and iron-containing concentrate.

If desired, and circumstances demand it, the gaseous medium, instead of being saturated as to its ionized condition, may be unsaturated. The gaseous medium introduced into each flotation bath may be charged under pressure or under a vacuum. However, it is preferred to use a small pressure above atmospheric pressure when treating blast furnace dust.

If desired, the flotation agent may be introduced in the bath in a mixture with the circulating water.

While, as indicated, the present process of treating composite material containing carbonaceous values, metalliferous values and gangue is especially applicable to the treatment of waste materials, it is obvious that the invention in its broadest form is of wider scope and that other composite material containing carbonaceous values, metalliferous values and gangue may be treated to recover the valuable constituents thereof.

As pointed out, it is desirable to disintegrate the composite material in order to assist in maintaining the proper relationship of the fluid to mass in the flotation bath. Of course, it is obvious that this relationship will vary, depending on the physical and chemical characteristics of the composite material being treated and the flotation bath used, together with its additions. My experiments indicate that the mass should be from 12 to 25% in volume to that of the liquid, preferably varying between 12 and 15%.

Foundry sands which have been used in foundry operations, including molding, may contain graphite and small particles of iron. For example, in cleaning castings, a large amount of small particles of iron will remain in the sand unless the sand is properly screened before reusing, and screening does not usually effect a very efficient purification. Again, graphite is used universally as a surfacer in the finished mold, and the sand, if reused for such molding operation, will have graphite present, unless the graphite is removed. Utilizing the present process, graphite, small particles of iron, and other impurities may be removed and the sand reconditioned in a manner not now possible.

In the claims, the expressions flue dust, furnace dust, blast furnace dust, and iron blast furnace dust are to be given the ordinary meaning in the furnace dust art as covering the product emanating from the furnace and comprising a composite material having both coarse and fine particles present. In other words, these expressions are not to be construed as being limited to a material having only very fine particles present as is sometimes understood by the term "dust".

What I claim is:

1. The process of treating iron blast furnace dust containing carbonaceous values, metalliferous values, and gangue, comprising subjecting the iron blast furnace dust to a bubble flotation-treatment whereby there is produced a carbonaceous concentrate and a gangue containing the metalliferous values, subjecting the carbonaceous concentrate to a bubble flotation-treatment to produce a relatively pure carbonaceous material, subjecting said gangue containing the metalliferous values to a bubble flotation-treatment to produce a metalliferous concentrate, and recovering the pure carbonaceous material and the metalliferous concentrate.

2. The process of treating iron blast furnace dust containing carbonaceous values, metalliferous values and gangue, comprising subjecting the iron blast furnace dust to a bubble flotation-treatment employing a flotation bath, floating a carbonaceous concentrate from the top zone of the bath, allowing the gangue containing metalliferous values to sink through the bath, subjecting the carbonaceous concentrate to a bubble flotation-treatment employing a flotation bath, floating a relatively pure, carbonaceous material therefrom, subjecting said gangue containing metalliferous values to a bubble flotation-treatment employing a flotation bath, floating a metalliferous concentrate therefrom, and recovering relatively pure carbonaceous material and metalliferous concentrate.

3. The flotation process employing a bubble flotation bath for the treatment of iron blast furnace dust containing carbonaceous values, metalliferous values and a gangue in which a predominating amount of the material undergoing treatment is raised or floated from the gangue, comprising reducing the larger particles of said iron blast furnace dust to a disintegrated condition adapted to maintain the proper relationship between the fluid and mass of the flotation bath, and allow the valuable disintegrated material to rise to the top zone of the bath, subjecting the disintegrated material to a series of bubble flotation operations to produce a purified carbonaceous product, and a metalliferous concentrate.

4. A bubble flotation process for the treatment of iron blast furnace dust containing carbonaceous values, metalliferous values and gangue in which a predominating amount of the material undergoing treatment is raised or floated from the gangue, comprising reducing the larger particles of said iron blast furnace dust to a disintegrated condition adapted to maintain the proper relationship between the fluid and mass of the flotation bath and allow the disintegrated material to rise to the top zone of the bath, subjecting the disintegrated material to a bubble flotation-treatment whereby there is produced a carbonaceous concentrate and a gangue containing metalliferous values, subjecting the carbonaceous concentrate to a bubble flotation-treatment to produce relatively pure carbonaceous material, subjecting said gangue containing metalliferous values to a bubble flotation-treatment to produce a metalliferous concentrate and recovering the pure carbonaceous product and metalliferous concentrate.

5. The process of treating by flotation flue dust and the like containing carbonaceous values, metalliferous values and gangue, comprising introducing flue dust into a flotation bath having present a gaseous medium strongly and controllably charged with electrical ions, collecting from said bath a carbonaceous concentrate and a gangue containing metalliferous values, introducing the carbonaceous concentrate into a flotation bath having present a gaseous medium strongly and controllably charged with electrical ions, collecting a relatively pure carbonaceous material therefrom, introducing said gangue containing the metalliferous values into a flotation bath strongly and controllably charged with electrical ions, and collecting a metalliferous concentrate therefrom.

6. The process of treating by flotation flue dust and the like containing carbonaceous values, metalliferous values and gangue, comprising introducing flue dust into a flotation bath having present a gaseous medium strongly and controllably charged with electrical ions, floating from said bath a carbonaceous concentrate, collecting a gangue containing metalliferous values, introducing the carbonaceous concentrate into a flotation bath having present a gaseous medium strongly and controllably charged with electrical ions, floating a relatively pure carbonaceous material therefrom, introducing said gangue containing the metalliferous values into a flotation bath strongly and controllably charged with electrical ions, and floating a metalliferous concentrate therefrom.

7. The process of treating by flotation flue dust and the like containing carbonaceous values in predominating proportion, metalliferous values and a gangue, comprising introducing flue dust into a flotation bath having present a gaseous medium strongly and controllably charged with electrical ions, floating from said bath a carbonaceous concentrate, collecting a gangue containing metalliferous values, introducing the carbonaceous concentrate into a flotation bath having present a gaseous medium strongly and controllably charged with electrical ions, floating a relatively pure carbonaceous material therefrom, introducing said gangue containing the metalliferous values into a flotation bath strongly and controllably charged with electrical ions, and floating a metalliferous concentrate therefrom.

8. The process of treating by flotation flue dust and the like containing carbonaceous values, metalliferous values and a gangue, comprising subjecting said flue dust to a series of bubble flotation-treatments in baths having present a gaseous medium strongly and controllably charged with electrical ions and in which a preponderating amount of the material being treated is raised from and floated from each flotation bath.

9. The process of treating flue dust and the like containing carbonaceous values, metalliferous values and gangue, comprising subjecting flue dust to a series of flotation-treatments employing a bubble flotation bath in which a predominating amount of the material under treatment is raised and floated from each flotation bath, each of said flotation baths having present a gaseous medium strongly and controllably charged with electrical ions.

10. A flotation process employing a flotation bath for the treatment of iron blast furnace dust containing carbonaceous values, metalliferous values and gangue in which the preponderating amount of material undergoing treatment is raised or floated from the gangue, comprising reducing the larger particles of said iron blast furnace dust to a disintegrated condition adapted to maintain the proper relationship between the fluid and mass of the flotation bath and allow the valuable disintegrated material to rise to the top zone of the bath, subjecting said material to a series of bubble flotation operations having present in the bath a gaseous medium strongly and controllably charged with electrical ions and collecting a purified carbonaceous product and a metalliferous concentrate.

11. The process of recovering coke-dust and iron-containing material from furnace dust comprising disintegrating the larger particles of said material so that they remain in a relatively coarse condition, introducing the disintegrated material into a bubble flotation-bath, collecting therefrom a coke-dust concentrate containing impurities and a middling product containing iron and gangue, introducing said coke-dust concentrate into a bubble flotation-bath, collecting a relatively pure coke dust therefrom, introducing said middling product into a bubble flotation bath, and collecting an iron-containing concentrate therefrom.

12. The process of recovering coke-dust and iron-containing material from furnace dust comprising disintegrating the larger particles of said material so that they remain in a relatively coarse condition, introducing the disintegrated material into a floatation bath, collecting therefrom a coke-dust concentrate containing impurities and a middling product containing iron, introducing said coke-dust concentrate into a flotation bath, collecting a relatively pure coke-dust therefrom, introducing said middling product into a flotation bath, and collecting therefrom an iron-containing concentrate, each of said flotation baths having present a gaseous medium strongly and controllably charged with electrical ions.

13. The process of recovering coke dust and iron-containing material from furnace dust comprising introducing said material into a bubble flotation bath, collecting therefrom a coke dust concentrate containing impurities and a middling product containing iron and gangue, introducing said coke dust concentrate into a flotation bath, collecting a relatively pure coke dust therefrom, dehydrating and drying the coke dust, introducing said middling product into a flotation bath, collecting an iron-containing concentrate therefrom, and dehydrating and drying the same.

14. The process of recovering a carbonaceous product and a metalliferous concentrate from blast furnace dust comprising introducing blast furnace dust into a bubble flotation bath having present a gaseous medium strongly and controllably charged with electrical ions, and collecting therefrom separate carbonaceous and metalliferous concentrates.

15. The process of recovering coke dust and iron containing material from iron blast furnace dust comprising introducing said iron blast furnace dust into a bubble flotation bath having present a gaseous medium strongly and controllably charged with electrical ions, and collecting therefrom separate carbonaceous and metalliferous concentrates.

16. The process of recovering valuable constituents from composite iron blast furnace dust comprising introducing said iron blast furnace dust into a bubble flotation bath containing a gaseous medium strongly and controllably charged with electrical ions, the iron blast furnace dust having present coke in a relatively coarse state and iron-containing material, and collecting from the flotation bath separate coke and iron-containing concentrates.

FREDERICK TSCHUDY.